US012354418B2

(12) United States Patent
Bailey et al.

(10) Patent No.: US 12,354,418 B2
(45) Date of Patent: Jul. 8, 2025

(54) DETERMINING A LOCATION OF A SQUEAK OR RATTLE ASSOCIATED WITH A VEHICLE

(71) Applicant: Nissan North America, Inc., Franklin, TN (US)

(72) Inventors: Mark Bailey, Seattle, WA (US); Erik St. Gray, Tacoma, WA (US); Kevin Kochever, San Bruno, CA (US); Stefan Witwicki, San Carlos, CA (US)

(73) Assignee: Nissan North America, Inc., Franklin, TN (US)

( * ) Notice: Subject to any disclaimer, the term of this patent is extended or adjusted under 35 U.S.C. 154(b) by 242 days.

(21) Appl. No.: 18/060,369

(22) Filed: Nov. 30, 2022

(65) Prior Publication Data

US 2024/0177545 A1 May 30, 2024

(51) Int. Cl.

| | |
|---|---|
| ***G07C 5/08*** | (2006.01) |
| ***H04R 1/08*** | (2006.01) |
| ***H04R 1/40*** | (2006.01) |
| ***H04R 3/00*** | (2006.01) |

(52) U.S. Cl.

CPC ......... *G07C 5/0825* (2013.01); *G07C 5/0808* (2013.01); *H04R 1/08* (2013.01); *H04R 1/406* (2013.01); *H04R 3/005* (2013.01); *H04R 2201/401* (2013.01); *H04R 2499/13* (2013.01)

(58) Field of Classification Search

None

See application file for complete search history.

(56) References Cited

U.S. PATENT DOCUMENTS

| | | | | |
|---|---|---|---|---|
| 10,482,869 | B1 * | 11/2019 | Conlon | G10K 11/17853 |
| 2017/0297549 | A1 * | 10/2017 | Huang | B60T 13/745 |
| 2018/0272966 | A1 * | 9/2018 | Bruns | B60R 16/0234 |
| 2018/0350167 | A1 * | 12/2018 | Ekkizogloy | B60R 11/0247 |

OTHER PUBLICATIONS

Lee, G., Kim, K., and Kim, J., "Development of an Algorithm to Automatically Detect and Distinguish Squeak and Rattle Noises," SAE Technical Paper 2015-01-2258, 2015, https://doi.org/10.4271/2015-01-2258.; Abstract only.

* cited by examiner

*Primary Examiner* — James J Lee
*Assistant Examiner* — Jonathan E Reinert
(74) *Attorney, Agent, or Firm* — Young Basile Hanlon & MacFarlane, P.C.

(57) ABSTRACT

A system may detect a sound associated with a vehicle. The sound may be detected using a set of one or more microphones. The system may use a machine learning model to detect at least one of a squeak or a rattle based on the sound. The machine learning model may be trained using a plurality of sounds emitted in relation to one or more vehicles. The system may determine, based on detecting at least one of the squeak or the rattle, a location of the vehicle associated with at least one of the squeak or the rattle. In some implementations, the location may be determined based on detecting different sound levels between a first microphone and a second microphone, or detecting a time difference between the first and the second microphone, or by correlating the sound to a sound signature associated with a part of the vehicle.

20 Claims, 9 Drawing Sheets

DETERMINING A LOCATION OF A SQUEAK OR RATTLE ASSOCIATED WITH A VEHICLE

TECHNICAL FIELD

This disclosure relates generally to vehicles, and more particularly to determining a location of a squeak or rattle associated with a vehicle.

BACKGROUND

A vehicle, such as an electric vehicle, an internal combustion engine vehicle, or a hybrid vehicle, may experience a squeak or rattle while traversing a portion of a vehicle transportation network (e.g., a road). A squeak or rattle may be an undesirable sound caused by friction between components associated with the vehicle (e.g., a squeak) or a component of the vehicle loosening and contacting another component of the vehicle (e.g., a rattle).

SUMMARY

Disclosed herein are aspects, features, elements, implementations, and embodiments of determining a location of a squeak or rattle associated with a vehicle.

An aspect of the disclosed embodiments is a method for determining a location of a squeak or rattle associated with a vehicle (e.g., a location within the vehicle). The method may include detecting a sound associated with a vehicle, wherein the sound is detected using a set of one or more microphones; using a machine learning model to detect at least one of a squeak or a rattle based on the sound, wherein the machine learning model is trained using a plurality of sounds emitted in relation to one or more vehicles; and determining, based on detecting at least one of the squeak or the rattle, a location of the vehicle associated with at least one of the squeak or the rattle.

In an aspect of the method, the location is determined based on detecting different sound levels between a first microphone and a second microphone of the set of one or more microphones.

In an aspect of the method, the location is determined based on detecting a time difference between a first microphone of the set of one or more microphones receiving the sound and a second microphone of the set of one or more microphones receiving the sound.

In an aspect of the method, the location is determined based on correlating the sound to a sound signature associated with a part of the vehicle.

Another aspect of the method includes maintaining a count of detections of at least one of the squeak or the rattle at the location; and triggering an action when the count of detections exceeds a minimum threshold.

Another aspect of the method includes triggering an action when the location is associated with a first part of the vehicle; and preventing the action from triggering when the location is associated with a second part of the vehicle.

Another aspect of the method includes determining a lower severity or a higher severity based on the location; generating an on-board diagnostics code when determining the lower severity; and outputting a message to a human machine interface (HMI) in the vehicle when determining the higher severity.

Another aspect of the method includes determining a lower severity or a higher severity based on the location, wherein the lower severity is determined when the location is associated with an interior trim of the vehicle and the higher severity is determined when the location is associated with a frame of the vehicle.

Another aspect of the method includes determining a part number associated with a part of the vehicle based on the location.

In an aspect of the method, the machine learning model is trained by playing the plurality of sounds through speakers configured in the one or more vehicles.

Another aspect of the disclosed embodiments is a system for determining a location of a squeak or rattle associated with a vehicle associated that includes a set of one or more microphones configured in relation to a vehicle; a memory; and a processor configured to execute instructions stored in the memory. The processor may execute the instructions stored in the memory to detect a sound associated with the vehicle, wherein the sound is detected using the set of one or more microphones; use a machine learning model to detect at least one of a squeak or a rattle based on the sound, wherein the machine learning model is trained using a plurality of sounds emitted in relation to one or more vehicles; and determine, based on detecting at least one of the squeak or the rattle, a location of the vehicle associated with at least one of the squeak or the rattle.

In another aspect of the system, the location is determined based on detecting different sound levels between a first microphone and a second microphone of the set of one or more microphones.

In another aspect of the system, the location is determined based on detecting a time difference between a first microphone of the set of one or more microphones receiving the sound and a second microphone of the set of one or more microphones receiving the sound.

In another aspect of the system, the location is determined based on correlating the sound to a sound signature associated with a part of the vehicle.

In another aspect of the system, the processor is further configured to execute instructions stored in the memory to maintain a count of detections of at least one of the squeak or the rattle at the location; and trigger an action when the count of detections exceeds a minimum threshold.

In another aspect of the system, the processor is further configured to execute instructions stored in the memory to trigger an action when the location is associated with a first part of the vehicle; and exclude triggering the action when the location is associated with a second part of the vehicle.

In another aspect of the system, the processor is further configured to execute instructions stored in the memory to determine a lower severity or a higher severity based on the location; generate an on-board diagnostics code when determining the lower severity; and output a message to an HMI in the vehicle when determining the higher severity.

In another aspect of the system, the processor is further configured to execute instructions stored in the memory to determine a lower severity or a higher severity based on the location, wherein the lower severity is determined when the location is associated with an interior trim of the vehicle and the higher severity is determined when the location is associated with a frame of the vehicle.

Another aspect of the disclosed embodiments is a vehicle that determines a location associated with a squeak or rattle that includes a set of one or more microphones and one or more processors that execute computer-readable instructions. The one or more processors may execute the computer-readable instructions to detect a sound associated with the vehicle, wherein the sound is detected using the set of one or more microphones; use a machine learning model to detect at least one of a squeak or a rattle based on the sound, wherein the machine learning model is trained using a plurality of sounds emitted in relation to one or more vehicles; and determine, based on detecting at least one of the squeak or the rattle, a location of the vehicle associated with at least one of the squeak or the rattle.

In another aspect of the vehicle, the vehicle could be an electric vehicle, an internal combustion engine vehicle, or a hybrid vehicle having an accessory loop, and the one or more processors further execute computer-readable instructions that cause the one or more processors to trigger an action using the accessory loop based on determining the location.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements unless otherwise noted.

DETAILED DESCRIPTION

Figure 1:
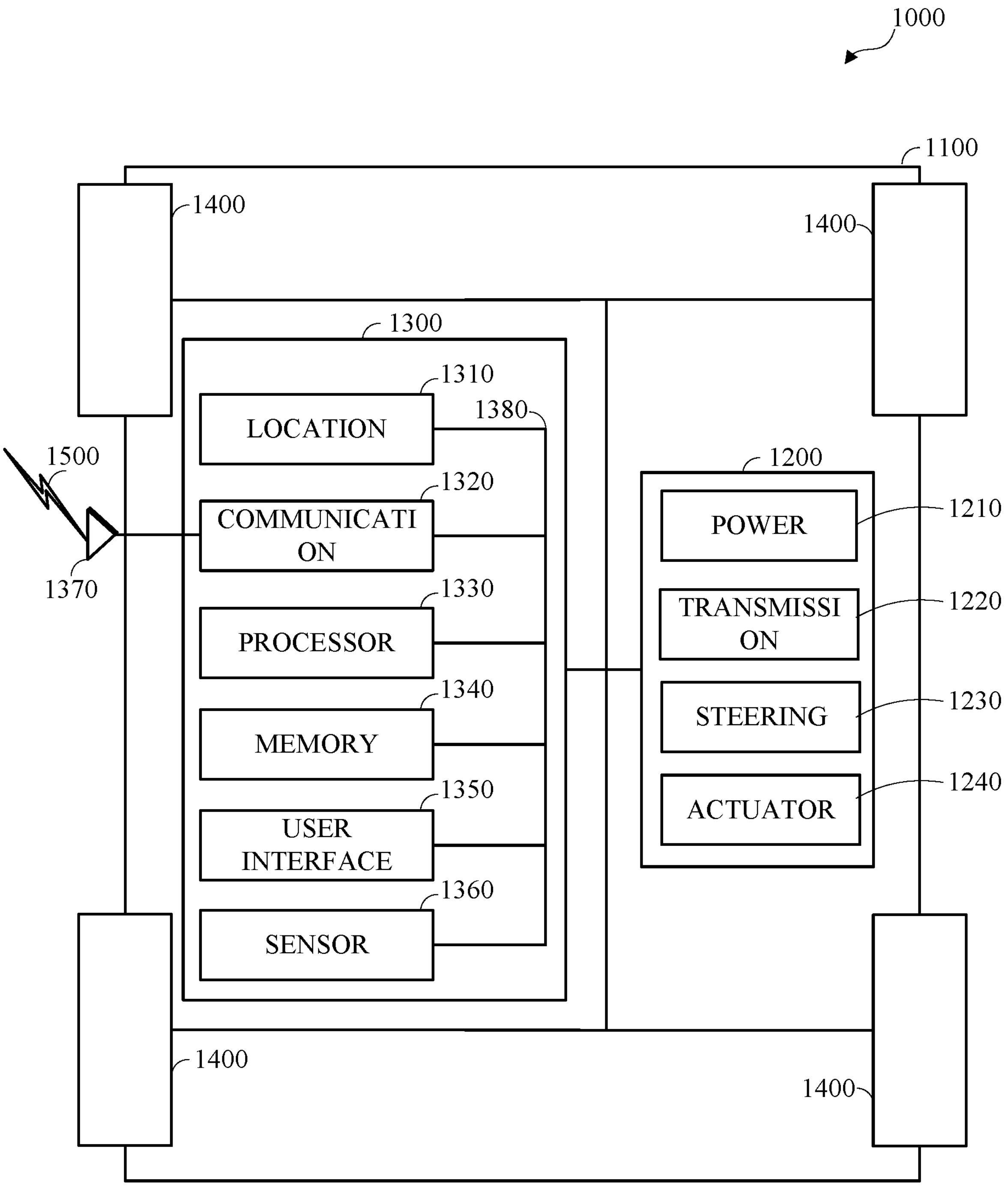
FIG. 1 is a diagram of an example of a vehicle in which the aspects, features, and elements disclosed herein may be implemented.

A vehicle, such as an electric vehicle (EV), an internal combustion engine vehicle, or a hybrid vehicle, may experience a squeak or rattle while traversing a portion of a vehicle transportation network. The squeak or rattle may be more noticeable in some vehicles than in others. For example, the EV may be quieter than the internal combustion engine vehicle. As a result, squeaks and rattles, which may be undesirable sounds caused by friction between components associated with the vehicle, may be more noticeable to an occupant of an EV than to an occupant of an internal combustion engine vehicle. A squeak may be caused, for example, by two parts moving against one another, such as adjacent, interior trim components of the vehicle. A rattle may be caused, for example, by a component moving on its own accord, such as a loose screw.

While squeaks and rattles may be bothersome to an occupant in a vehicle, and therefore desirable to eliminate, squeaks and rattles may also be difficult to locate. For example, squeaks and rattles may be caused by components that are not readily visible to occupants, such as components behind the dashboard, under the seats, or external to the cabin of the vehicle, such as the wheels, suspension, or frame of the vehicle. Further complicating this, in some cases, a squeak or rattle may be part of an expected operation of the vehicle, such as a squeak during an initial wear-in period for new brake pads. Also, in some cases, a squeak or rattle may be caused by the occupant of the vehicle, such as a squeak caused by loose change in an article of clothing, or a rattle caused by equipment or baggage placed in the trunk or other storage of the vehicle. As a result, determining the cause of squeaks and rattles may be challenging.

Conventional approaches to determining a location of a squeak or rattle associated with a vehicle includes using “chassis ears.” In such cases, microphones may be attached to possible trouble spots in a vehicle, and the vehicle may then be driven in an attempt to capture the squeak or rattle using the microphones. If the squeak or rattle is not detected, then the microphones may be moved to another location and the vehicle is driven again. This process may repeat until the squeak or rattle is detected and the problem found. However, this process may be time consuming and burdensome, often involving trial and error in the placement of microphones until the problem is resolved. In some cases, individuals may resort to group knowledge sharing online, where information about squeaks and rattles is shared with others to help solve the own problem. However, this may also be time consuming and burdensome for the individual and may still possibly be unsuccessful.

Implementations of this disclosure address problems such as these by using a set of one or more microphones in a vehicle to detect sounds, and by using a machine learning model to determine squeaks and rattles from the sounds, to determine a location of the squeaks and rattles, to determine a severity of the squeaks and rattles based on the location, and to determine a part number, for replacement of a component to eliminate the squeaks and rattles, based on the location. The one or more microphones may be advantageously fixed, or statically placed, in the vehicle, unlike the chassis ears of the conventional approach which typically involve frequent movement. A squeak or rattle detection system may detect a sound associated with a vehicle using the set of one or more microphones, which may be distributed around the vehicle (e.g., internal and external to the cabin). The squeak or rattle detection system may use a machine learning model to detect a squeak or rattle based on the sound. The machine learning model may be trained using a plurality of sounds emitted in relation to one or more vehicles. The squeak or rattle detection system may determine, based on detecting the squeak or rattle, a location of the vehicle associated with the squeak or rattle.

Although described herein with reference to an EV, which could also be an autonomous vehicle or semi-autonomous vehicle, the methods and apparatus described herein may be implemented in any vehicle, including an internal combustion engine vehicle or a hybrid vehicle (e.g., electric and internal combustion engine). Although described with reference to a vehicle transportation network, the method and apparatus described herein may include the vehicle operating in any area navigable by the vehicle.

FIG. 1 is a diagram of an example of a vehicle in which the aspects, features, and elements disclosed herein may be implemented. In the embodiment shown, a vehicle 1000 includes a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 shown by example in FIG. 1 includes a power source 1210, a transmission 1220, a steering unit 1230, and an actuator 1240. Any other element or combination of elements of a powertrain, such as a suspension, a drive shaft, axles, or an exhaust system may also be included. Although shown separately, the wheels 1400 may be included in the powertrain 1200.

The power source 1210 includes an engine, a battery, or a combination thereof. The power source 1210 may be any device or combination of devices operative to provide energy, such as electrical energy, thermal energy, or kinetic energy. In an example, the power source 1210 includes an engine, such as an internal combustion engine, an electric motor, or a combination of an internal combustion engine and an electric motor, and is operative to provide kinetic energy as a motive force to one or more of the wheels 1400. Alternatively, or additionally, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400 to provide a motive force. The transmission 1220 may be controlled by the controller 1300, the actuator 1240, or both. The steering unit 1230 controls the wheels 1400 to steer the vehicle and may be controlled by the controller 1300, the actuator 1240, or both. The actuator 1240 may receive signals from the controller 1300 and actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Fewer of these elements may exist as part of the controller 1300. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 is operatively coupled with one or more of the location unit 1310, the memory 1340, the electronic communication interface 1370, the electronic communication unit 1320, the user interface 1350, the sensor 1360, and the powertrain 1200. For example, the processor 1330 may be operatively coupled with the memory 1340 via a communication bus 1380.

The memory 1340 includes any tangible non-transitory computer-usable or computer-readable medium, capable of, for example, containing, storing, communicating, or transporting machine readable instructions, or any information associated therewith, for use by or in connection with any processor, such as the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 is configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 includes a dedicated short range communications (DSRC) unit, an on-board unit (OBU), or a combination thereof.

The location unit 1310 may determine geolocation information, such as longitude, latitude, elevation, direction of travel, or speed, of the vehicle 1000. In an example, the location unit 1310 includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include both an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensors 1360 are operable to provide information that may be used to control the vehicle. The sensors 1360 may be an array of sensors. The sensors 1360 may provide information regarding current operating characteristics of the vehicle 1000, including vehicle operational information. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that are operable to report information regarding some aspect of the current dynamic situation of the vehicle 1000.

The sensors 1360 include one or more sensors that are operable to obtain information regarding the physical environment surrounding the vehicle 1000, such as operational environment information. For example, one or more sensors may detect road geometry, such as lane lines, and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel that is pivoted to a steering angle under control of the steering unit 1230, a propelled wheel that is torqued to propel the vehicle 1000 under control of the transmission 1220, or a steered and propelled wheel that may steer and propel the vehicle 1000.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 1300 may include the autonomous vehicle control unit.

When present, the autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to the trajectory controller to operate the vehicle 1000 to travel from the origin to the destination using the generated route.

Figure 2:
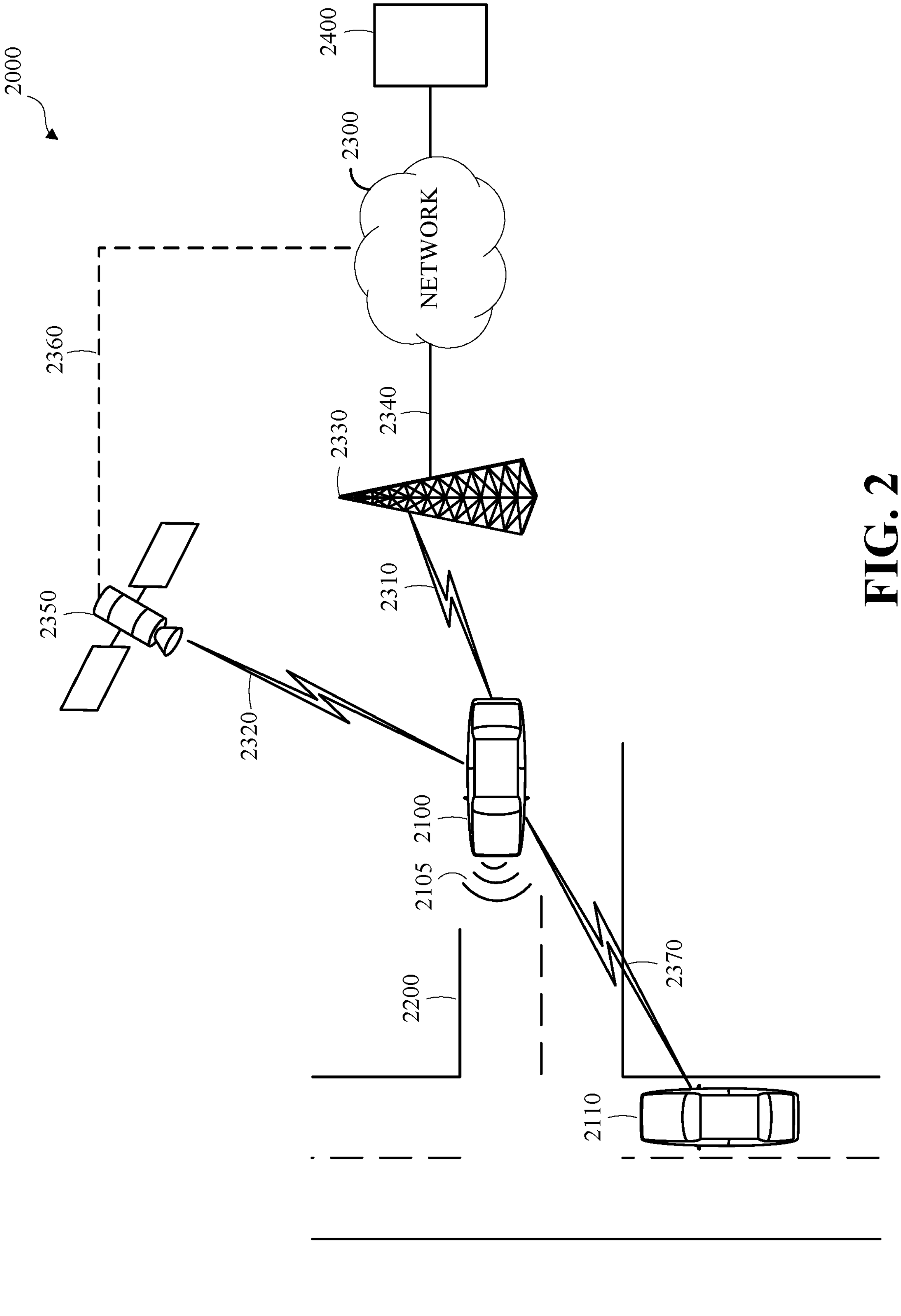
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which travels via one or more portions of the vehicle transportation network 2200, and communicates via one or more electronic communication networks 2300. Although not explicitly shown in FIG. 2, a vehicle may traverse an off-road area.

The electronic communication network 2300 may be, for example, a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. As shown, a vehicle 2100/2110 communicates via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. The remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, is configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 2100 may communicate with the communications network 2300 via a satellite 2350, or other non-terrestrial communication device. The satellite 2350, which may include a computing device, is configured to communicate with a vehicle 2100, with a communication network 2300, with one or more communication devices 2400, or with a combination thereof via one or more communication links 2320/2360. Although shown as a single unit here, a satellite may include any number of interconnected elements.

An electronic communication network 2300 is any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 2100 may identify a portion or condition of the vehicle transportation network 2200. For example, the vehicle includes at least one on-vehicle sensor 2105, like the sensors 1360 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both.

The vehicle 2100 may traverse a portion or portions of the vehicle transportation network 2200 using information communicated via the network 2300, such as information representing the vehicle transportation network 2200, information identified by one or more on-vehicle sensors 2105, or a combination thereof.

Although FIG. 2 shows one vehicle transportation network 2200, one electronic communication network 2300, and one communication device 2400, for simplicity, any number of networks or communication devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
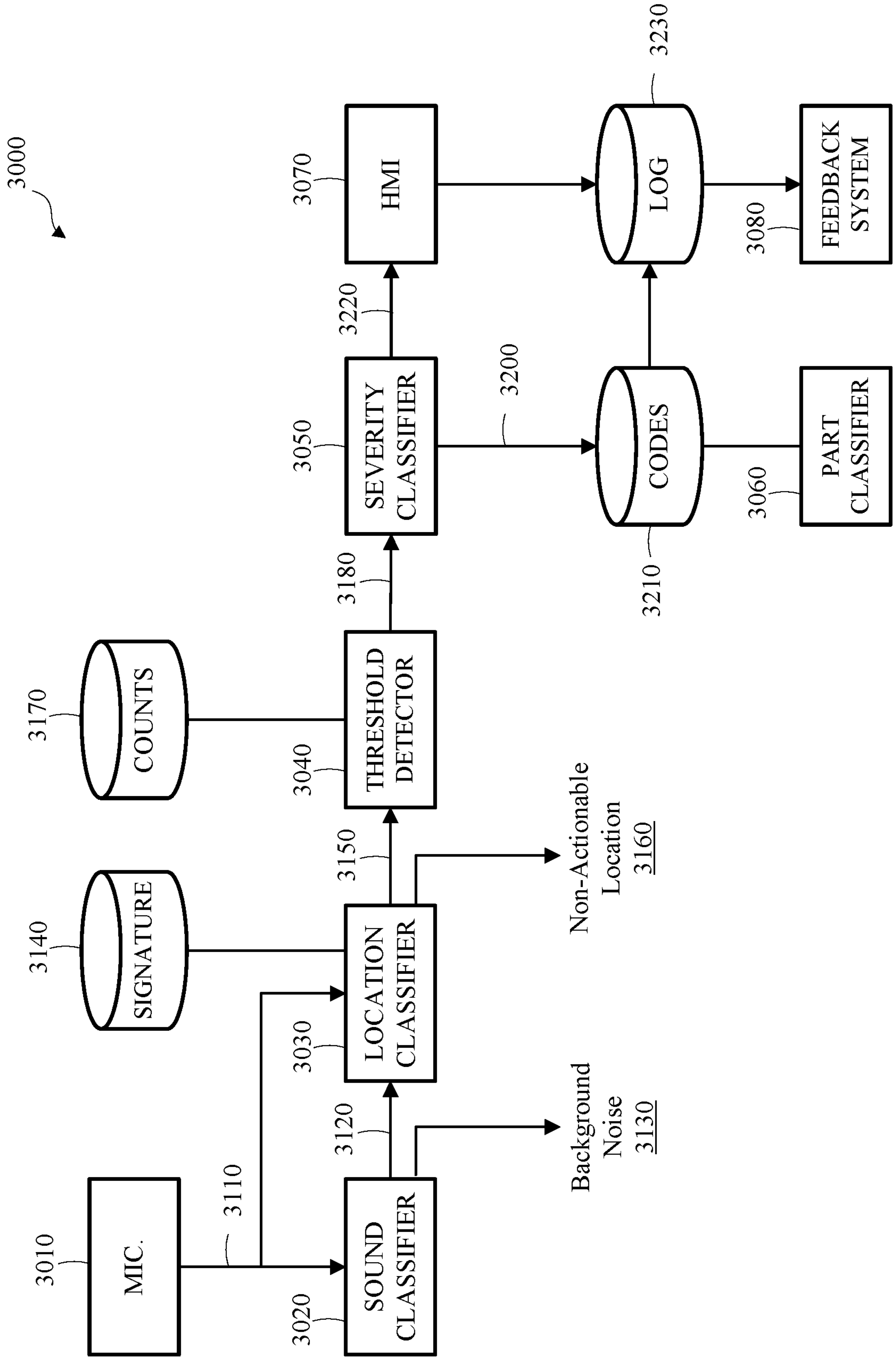
FIG. 3 is a block diagram of an example of a system for determining a location of a squeak or rattle associated with a vehicle.

FIG. 3 is a block diagram of an example of a system 3000 for determining a location of a squeak or rattle associated with a vehicle. The system 3000 could be a squeak or rattle detection system implemented by a vehicle, such as the vehicle 1000 shown in FIG. 1, or the vehicle 2100/2110 shown in FIG. 2. For example, the system 3000 could be implemented using the controller 1300. The system 3000 could be implemented using an accessory loop (e.g., electrical circuit) of the vehicle (e.g., associated with accessory functions of the vehicle, such as a stereo system and interior lights, as opposed to a primary loop of the vehicle associated with primary functions, such as the powertrain 1200).

The system 3000 may include a set of one or more microphones 3010, a sound classifier 3020, a location classifier 3030, a threshold detector 3040, a severity classifier 3050, a part classifier 3060, an HMI 3070, and a feedback system 3080. The set of one or more microphones 3010 may detect a sound associated with a vehicle. For example, the set of one or more microphones 3010 may include one or more microphones distributed around the vehicle (e.g., internal and external to the cabin which may occupied by one or more occupants, such as a driver or passenger of the vehicle). The sound could be a squeak, a rattle, or a background noise which may include any sounds that are not a squeak or rattle. For example, the background noise could include music playing in the vehicle (e.g., sound emitting from speakers of the vehicle), an occupant talking in the vehicle, a turn signal indicator or horn of the vehicle, and tires of the vehicle rolling on the vehicle transportation network (e.g., the road). The set of one or more microphones 3010 may generate time series, audio data 3110 having a frequency, amplitude, and phase responsive to the sound. The audio data 3110 may be transmitted to the sound classifier 3020 and/or the location classifier 3030.

The sound classifier 3020 may use a machine learning model to detect a squeak or rattle 3120, or background noise 3130, based on the sound represented in the audio data 3110. For example, the sound classifier 3020 may use a machine learning model to implement sound recognition (e.g., recognition of the squeak or rattle 3120 from the sound). In some implementations, the sound classifier 3020 may distinctly detect the presence of either a squeak based on the sound, a rattle based on the sound, or the background noise based on the sound (e.g., three separate classes). In some implementations, the sound classifier 3020 may detect the presence of a squeak or a rattle based on the sound, or the background noise based on the sound (e.g., two separate classes). In some implementations, the sound classifier 3020 may detect the presence of a squeak or a rattle based on the sound, or not detect such presence (e.g., one class). The sound classifier 3020 may include a machine learning model to process the audio data 3110 and detect the squeak or rattle 3120 based on the sound (e.g., as corresponding to a squeak, a rattle, or background noise). In some implementations, the sound classifier 3020 may include a digital signal processing (DSP) component to pre-process the audio data 3110 for the machine learning model.

The machine learning model may be trained using a plurality of sounds emitted in relation to one or more vehicles. For example, the machine learning model may be trained by emitting squeaks, rattles, and background noise, with corresponding labels, and training the machine learning model to correctly classify the squeaks, rattles, and background noise based on the labels. The squeaks, rattles, and background noise could be played as sounds through speakers of the one or more vehicles. For example, the machine learning model can be trained using a training data set including data samples representing squeaks, rattles, and background noise. The training data set can enable the machine learning model to learn patterns in audio data, such as the audio data 3110, corresponding to particular squeaks, particular rattles, or background noise. The training can be periodic, such as by updating the machine learning model on a discrete time interval basis (e.g., once per week or month), or otherwise. The training data set may derive from multiple vehicles (e.g., a fleet of vehicles, which may be like the vehicle in which the system 3000 is deployed) or may be specific to a particular vehicle (e.g., a vehicle that is a class of vehicle like the vehicle in which the system 3000, or the exact vehicle in which the system 3000 is deployed). The training data set may omit certain data samples that are determined to be outliers. The machine learning model may, for example, be or include one or more of a neural network (e.g., a convolutional neural network, recurrent neural network, deep neural network, or other neural network), decision tree, vector machine, Bayesian network, cluster-based system, genetic algorithm, deep learning system separate from a neural network, or other machine learning model. In some implementations, the training may be reinforced based on detections of true positives and true negatives via a feedback system, such as the feedback system 3080 (e.g., sounds may be recorded and fed back into the training, such as to reinforce true positives and true negatives, and reduce to false positives and false negatives).

The squeak or rattle 3120, detected by the sound classifier 3020, may be transmitted to the location classifier 3030. The sound classifier 3020 may prevent the background noise 3130 from being transmitted (e.g., the sound classifier 3020 may filter the sound to pass the squeak or rattle 3120 and block the background noise 3130). In some implementations, the sound classifier 3020 may include a DSP component to pre-process the squeak or rattle 3120 to prevent the background noise 3130 from being transmitted. For example, the sound classifier 3020 may include one or more low-pass and/or high-pass filters, a noise suppression system, such as a Fourier transform and frequency selection, wavelet-decomposition, or a machine learning model (e.g., which could be another software component, such as a second machine learning model implemented by the sound classifier 3020). For example, implementing a machine learning model could include collecting training data of first sound samples that include a squeak alone, second sound samples that include a squeak and background noise, third sound samples that include a rattle alone, and/or fourth sound samples that include a rattle and background noise. The training data may enable training the machine learning model to generate an output without the background noise (e.g., de-noised examples) from input with the background noise (e.g., noisy inputs).

The location classifier 3030 may process the audio data 3110 to detect a location of the vehicle associated with the squeak or rattle 3120. The location classifier 3030 may use a machine learning model to detect the location of the squeak or rattle 3120 based on the sound represented in the audio data 3110. For example, the sound classifier 3020 may use a machine learning model to implement sound recognition (e.g., recognition of the squeak or rattle 3120 from the sound). The location classifier 3030 may use a machine learning model to implement location detection (e.g., detection of the location based on the squeak or rattle 3120).

In some implementations, the location classifier 3030 may determine the location based on detecting different sound levels (e.g., amplitudes in the audio data 3110) between microphones of the set of one or more microphones 3010 receiving the sound. In some implementations, the location classifier 3030 may determine the location based on detecting a time difference (e.g., phases in the audio data 3110) between microphones of the set of one or more microphones 3010 receiving the sound. In some implementations, the location classifier 3030 may determine the location based on correlating the sound to a sound signature associated with a part of the vehicle. For example, the sound signature associated with the part may be maintained in a data structure 3140 that is accessed by the location classifier 3030. The location classifier 3030 may compare an amplitude, frequency, and phase of the audio data 3110 with an amplitude, frequency, and phase of a sound signature to determine a match. The location classifier 3030 may determine the location of the vehicle associated with the squeak or rattle 3120 to be actionable location 3150 or a non-actionable location 3160. The location classifier 3030 may use the machine learning model to process the audio data 3110 and determine the location based on the sound (e.g., as corresponding to the actionable location 3150 or the non-actionable location 3160). In some implementations, the location classifier 3030 may include a DSP component to pre-process the audio data 3110 for the machine learning model. In some implementations, the location classifier 3030 may cross reference the location to a map of parts to determine a part number for a part to be repaired or replaced.

The machine learning model may be trained based on a plurality of locations associated with the vehicle. For example, the machine learning model may be trained by associating locations with corresponding labels to squeaks and rattles, and training the machine learning model to correctly classify the locations based on the labels. A location could be a part of the vehicle associated with a part number. For example, the machine learning model can be trained using a training data set including data samples representing locations. The training data set can enable the machine learning model to learn patterns in audio data, such as the audio data 3110, corresponding to particular locations. The training can be periodic, such as by updating the machine learning model on a discrete time interval basis (e.g., once per week or month), or otherwise. The training data set may derive from multiple vehicles (e.g., a fleet of vehicles, which may be like the vehicle in which the system 3000 is deployed) or may be specific to a particular vehicle (e.g., a vehicle that is a class of vehicle like the vehicle in which the system 3000, or the exact vehicle in which the system 3000 is deployed). The training data set may omit certain data samples that are determined to be outliers. The machine learning model may, for example, be or include one or more of a neural network (e.g., a convolutional neural network, recurrent neural network, deep neural network, or other neural network), decision tree, vector machine, Bayesian network, cluster-based system, genetic algorithm, deep learning system separate from a neural network, or other machine learning model. In some implementations, the training may be reinforced based on determines of true positives and true negatives via a feedback system, such as the feedback system 3080 (e.g., sounds may be recorded and fed back into the training, such as to reinforce true positives and true negatives, and reduce to false positives and false negatives)

A location that is an actionable location 3150, determined by the location classifier 3030, may be transmitted to the threshold detector 3040. The sound classifier 3020 may prevent a location that is a non-actionable location 3160 from being transmitted (e.g., the location classifier 3030 may filter the location to pass the actionable location 3150 and block the non-actionable location 3160). An actionable location 3150 may include any location where a squeak or rattle is not part of an expected operation of the vehicle (e.g., a first part of the vehicle). For example, an actionable location 3150 may include components behind the dashboard or under the seats, such as interior trim of the vehicle, or components external to the cabin, such as a frame of the vehicle. Thus, the sound classifier 3020 may trigger an action when the location is an actionable location 3150 associated with a first part of the vehicle. A non-actionable location 3160 may include any location where a squeak or rattle is part of an expected operation of the vehicle (e.g., a second part of the vehicle). For example, a non-actionable location 3160 may include brake pads during an initial wear-in period, or an occupant area of the vehicle (e.g., internal to the cabin) which may include loose change in an article of clothing, or sports equipment in a trunk or other storage of the vehicle. Thus, the sound classifier 3020 may prevent an action from triggering when the location is a non-actionable location 3160 associated with a second part of the vehicle.

The threshold detector 3040 may receive the actionable location 3150 and may maintain a count of detections of the squeak or rattle 3120 at the actionable location 3150. For example, the count may be maintained in a data structure 3170 that is accessed by the threshold detector 3040. The threshold that is used by the threshold detector 3040 may be configurable by a user. For example, the threshold could be lower in some cases, such as for a first class of vehicle, and higher in other cases, such as for a second class of vehicle. The threshold may be set to require a minimum number of occurrences of the squeak or rattle 3120 at the actionable location 3150 (e.g., a minimum threshold) before triggering an action 3180. When a count of detections of the squeak or rattle 3120 at the actionable location 3150 exceeds the minimum threshold (e.g., 1000 times), the threshold detector 3040 may trigger, causing the action 3180, associated with the squeak or rattle 3120 at the actionable location 3150, to be transmitted to the severity classifier 3050. Thus, the threshold detector 3040 may enable reducing the effect of false positives by determining a minimum number of occurrences before triggering an action.

The severity classifier 3050 may receive the action 3180 indicating the squeak or rattle 3120 at the actionable location 3150. The severity classifier 3050 may determine a severity of the action 3180 based on the location (e.g., the actionable location 3150). For example, the severity classifier 3050 may determine the severity to be a lower severity or a higher severity based on the location. For example, the severity classifier 3050 may determine a squeak or rattle associated with components behind the dashboard or under the seats, such as interior trim of the vehicle, to be a lower severity. The severity classifier 3050 may determine a squeak or rattle associated with components external to the cabin, such as a frame of the vehicle, to be a higher severity. The higher severity could correspond, for example, to a greater importance for repair, whereas the lower severity could correspond to a lesser importance for repair.

In some implementations, if the severity classifier 3050 determines the severity to be a lower severity, the severity classifier 3050 may transmit a lower severity signal 3200 to generate an on-board diagnostics (OBD) code corresponding to the action 3180. For example, the OBD code may be maintained in a data structure 3210 that is accessed by the severity classifier 3050. A repair technician could access the OBD code in the data structure 3210 when conducting a repair (e.g., a repair technician could use a diagnostic scanner to retrieve the OBD code, such as via the electronic communication interface 1370). Further, the severity classifier 3050 may access the part classifier 3060 to determine a part number associated with a part of the vehicle based on the location, and the part number may be stored in the data structure 3210 with the OBD code. The repair technician could access the part number when conducting a repair (e.g., via the diagnostic scanner) to facilitate repair one or more components of the vehicle.

In some implementations, if the severity classifier 3050 determines the severity to be a higher severity, the severity classifier 3050 may transmit a higher severity signal 3220 to output a message to the HMI 3070 in the vehicle (e.g., the user interface 1350). The message may be an alert to an occupant of the vehicle that a squeak or rattle was detected at a location, and that the occupant should stop the vehicle, lower the speed of the vehicle, or service the vehicle soon (e.g., at a next mileage interval). The higher severity signal 3220 may be transmitted to the HMI 3070 in addition to the lower severity signal 3200. For example, the higher severity signal 3220 may also generate an OBD code corresponding to the action 3180, and may cause the part classifier 3060 to determine a part number associated with a part of the vehicle based on the location.

In some implementations, generation of the OBD code (e.g., by the lower severity signal 3200 or the higher severity signal 3220) may cause a log entry in a data structure 3230. For example, the log entry may be used to for tracking quality. In some cases, the log entry may be used by the feedback system 3080 to reinforce detections of true positives and true negatives by one or more machine learning models in the system 3000 (e.g., sounds may be recorded and fed back into the training, such as to reinforce true positives and true negatives, and reduce to false positives and false negatives).

The part classifier 3060 may use a machine learning model trained using a plurality of parts associated with the vehicle. For example, the machine learning model may be trained by associating parts with corresponding labels to squeaks and rattles, and training the machine learning model to correctly classify the parts based on the labels. A part could be a part of the vehicle associated with a part number, which may be used for ordering a replacement part for the vehicle. For example, the machine learning model can be trained using a training data set including data samples representing parts. The training data set can enable the machine learning model to learn patterns in squeaks and rattles, corresponding to particular parts. The training can be periodic, such as by updating the machine learning model on a discrete time interval basis (e.g., once per week or month), or otherwise. The training data set may derive from multiple vehicles (e.g., a fleet of vehicles, which may be like the vehicle in which the system 3000 is deployed) or may be specific to a particular vehicle (e.g., a vehicle that is a class of vehicle like the vehicle in which the system 3000, or the exact vehicle in which the system 3000 is deployed). The training data set may omit certain data samples that are determined to be outliers. The machine learning model may, for example, be or include one or more of a neural network (e.g., a convolutional neural network, recurrent neural network, deep neural network, or other neural network), decision tree, vector machine, Bayesian network, cluster-based system, genetic algorithm, deep learning system separate from a neural network, or other machine learning model. In some implementations, the training may be reinforced based on determines of true positives and true negatives via a feedback system, such as the feedback system 3080 (e.g., sounds may be recorded and fed back into the training, such as to reinforce true positives and true negatives, and reduce to false positives and false negatives).

In some implementations, a name, a part number, and a cost associated with a part that is determined to be replaced (e.g., by the part classifier 3060) may be output to the HMI 3070. In some implementations, after the squeak or rattle 3120 at the actionable location 3150 is repaired, the correctness or incorrectness of one or more prediction generated by the system 300 (e.g., generated by one or more of the machine learning models) may be recorded and used to further train and/or refine the model (e.g., via the feedback system 3080).

Figure 4:
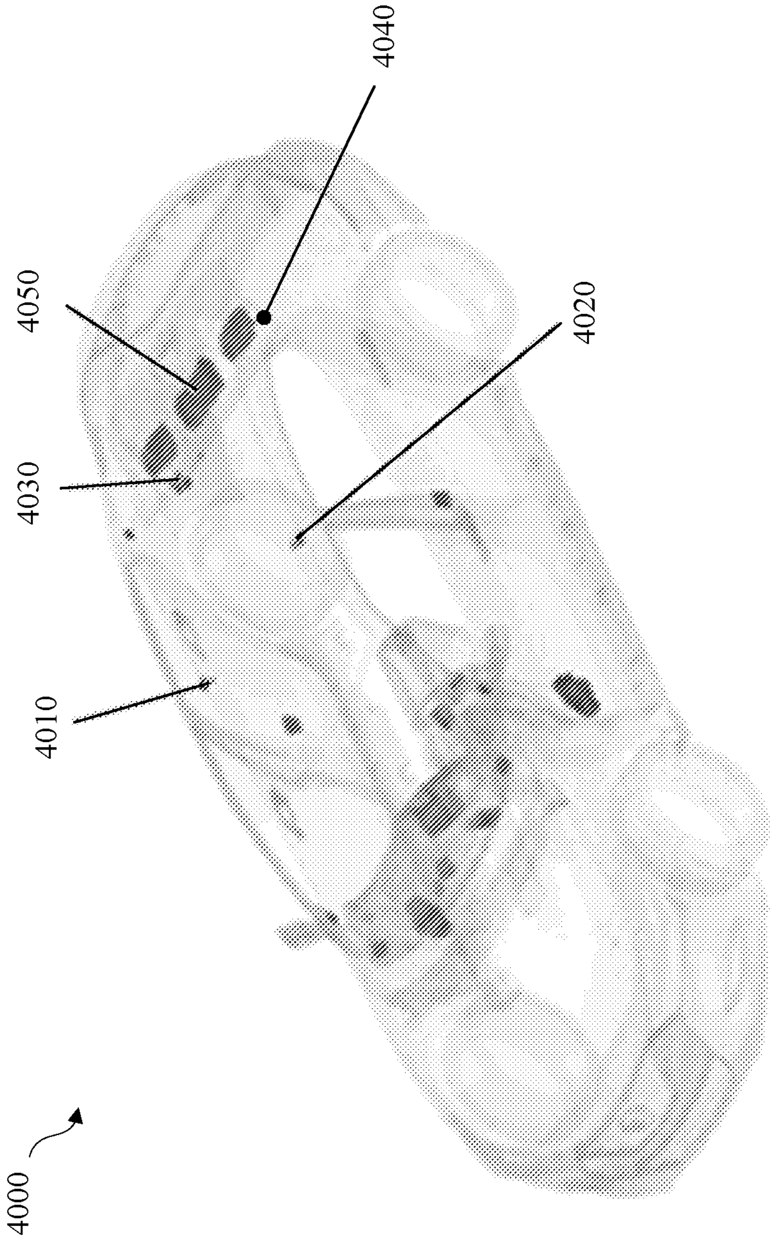
FIG. 4 is an illustration of an example of a vehicle using a set of one or more microphones.

FIG. 4 is an illustration of an example of a vehicle 4000 using a set of one or more microphones. For example, the vehicle 4000 could be the vehicle 1000 shown in FIG. 1, or the vehicle 2100/2110 shown in FIG. 2. The vehicle 4000 could be an EV, an internal combustion engine vehicle, or a hybrid vehicle. In some implementations, the vehicle 4000 may be autonomous or semi-autonomous. The vehicle 4000 could implement the system 3000 shown in FIG. 3. For example, the set of one or more microphones could be the set of one or more microphones 3010 shown in FIG. 3. For example, the set of one or more microphones may include a first microphone 4010, a second microphone 4020, a third microphone 4030, and a fourth microphone 4040. The first microphone 4010 could be a front right microphone, the second microphone 4020 could be a front left microphone, the third microphone 4030 could be a rear right microphone, and the fourth microphone 4040 could be a rear left microphone. Although four microphones are shown and described by example, other numbers of microphones may be used with the vehicle 4000. The set of one or more microphones may generate audio data (e.g., the audio data 3110) that may be used to determine a location of a squeak or rattle associated with the vehicle 4000. In some implementations, the audio data generated by the set of one or more microphones may be used to triangulate a position of a sound in the vehicle 4000.

In some implementations, the set of one or more microphones may include microphones that vary in detection capability. For example, the set of one or more microphones may include a larger group of one or more microphones that may be less capable while being more cost effective (e.g., twelve less capable microphones), and a smaller group of one or more microphones that may be more capable while being less cost effective (e.g., four to six more capable microphones).

The vehicle 4000 may also include a set of one or more speakers 4050. In some implementations, the set of one or more speakers 4050 may be used to train one or more machine learning models in the system (e.g., in the system 3000, such as the sound classifier 3020 and/or the location classifier 3030). For example, squeaks, rattles, and background noise could be played as sounds through the set of one or more speakers 4050 to train the one or more machine learning models. In some implementations, training the one or more machine learning models may include selectively playing sounds from different speakers in different locations of the vehicle. This may enable configuring improved machine learning models by replicating sounds in corresponding areas of the vehicle (e.g., a sound associated with a dashboard or front portion of the frame being played by a front speaker, while a sound associated with a trunk or rear portion of the frame being played by a rear speaker). In some implementations, the machine learning model may be trained using sound samples corresponding to audio data recorded from one or more actual vehicles having squeaks or rattles (e.g., that have developed squeaks or rattles naturally, such as a higher mileage vehicle or an older vehicle). For example, a sound sample could be a recorded sound from a customer vehicle that has been taken to service center for repair. In some implementations, the machine learning model could be trained using actual squeaks or rattles that are generated synthetically. For example, a force could be applied to one or more components or parts of a vehicle to cause the one or more components or parts to move in a manner that emits a squeak or rattle. In some implementations, the machine learning model could be trained using multiple ones of the foregoing techniques in combination.

In some implementations, the set of one or more microphones and the set of one or more speakers 4050 may be used in a noise cancelation system. For example, the set of one or more microphones may be used to detect noise, and the set of one or more speakers 4050 may be used to play sounds that cancel the detected noise.

Figure 5:
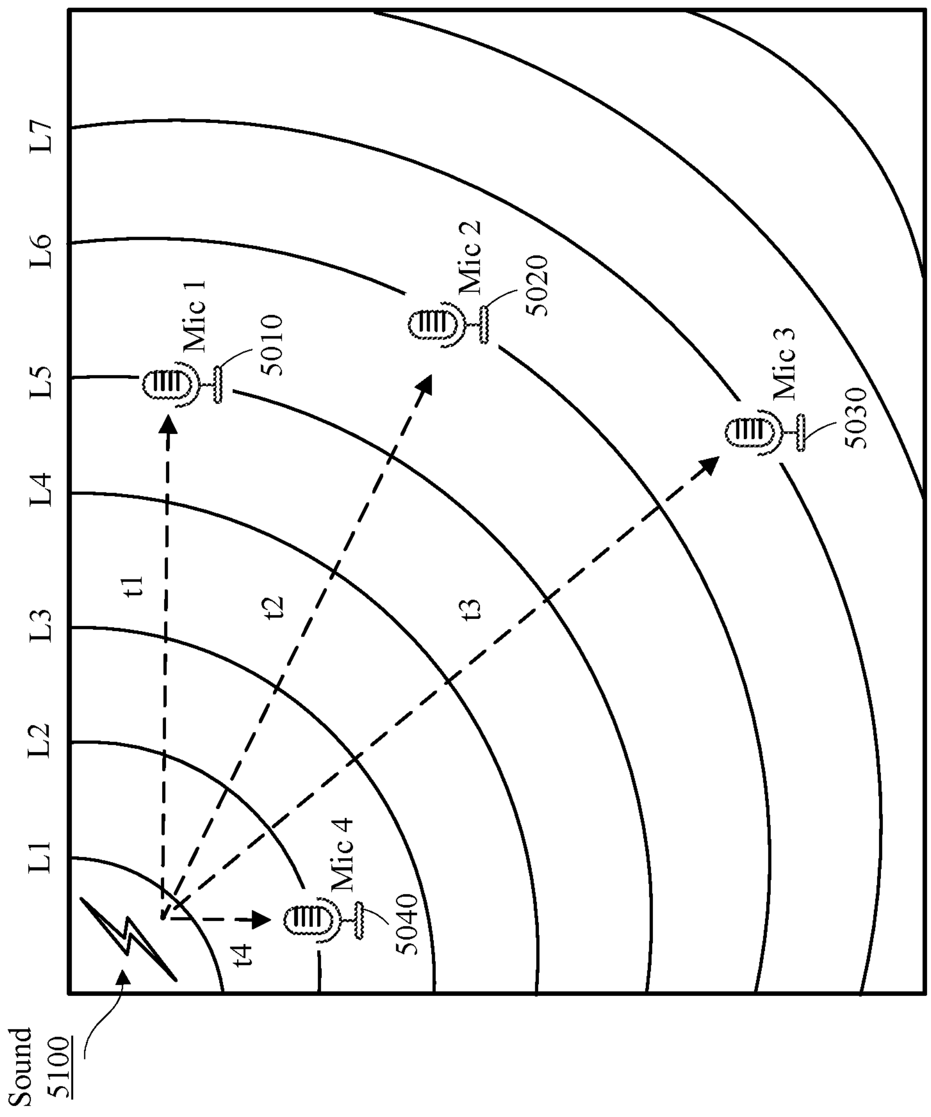
FIG. 5 is an illustration of an example of detecting a sound associated with a vehicle using a set of one or more microphones.

FIG. 5 is an illustration of an example of detecting a sound 5100 associated with a vehicle using a set of one or more microphones. For example, the sound 5100 could be associated with the vehicle 1000 shown in FIG. 1, the vehicle 2100/2110 shown in FIG. 2, or the vehicle 4000 shown in FIG. 4. The vehicle could implement the system 3000 shown in FIG. 3. For example, the set of one or more microphones could be the set of one or more microphones 3010 shown in FIG. 3, or the set of one or more microphones shown in FIG. 4. For example, the set of one or more microphones may include a first microphone 5010 (e.g., "Mic 1," which could be the first microphone 4010), a second microphone 5020 (e.g., "Mic 2," which could be the second microphone 4020), a third microphone 5030 (e.g., "Mic 3," which could be the third microphone 4030), and a fourth microphone 5040 (e.g., "Mic 4," which could be the fourth microphone 4040). Although four microphones are shown and described by example, other numbers of microphones may be used with the vehicle.

The set of one or more microphones may generate audio data (e.g., the audio data 3110) that may be used to determine a location of the sound 5100, which may be used to determine a location of a squeak or rattle associated with the vehicle. For example, the audio data may include first audio data generated by the first microphone 5010, second audio data generated by the second microphone 5020, third audio data generated by the third microphone 5030, and fourth audio data generated by the fourth microphone 5040. The audio data generated by each microphone may include have a frequency, amplitude, and phase responsive to the sound 5100. A sound classifier (e.g., the sound classifier 3020) may detect a squeak or rattle, or background noise, based on the sound 5100 represented in the audio data. A location classifier (e.g., the location classifier 3030) may process the audio data to detect a location of the vehicle associated with the squeak or rattle.

In some implementations, the location classifier may determine the location based on detecting different sound levels (e.g., amplitudes in the audio data) between microphones of the set of one or more microphones receiving the sound 5100. For example, the location classifier may determine the location based on detecting a first sound level (e.g., an amplitude "L5") at the first microphone 5010, a second sound level (e.g., an amplitude "L6") at the second microphone 5020, a third sound level (e.g., an amplitude "L7") at the third microphone 5030, and a fourth sound level (e.g., an amplitude "L2") at the fourth microphone 5040. Based on the predetermined positions of the set of one or more microphones in the vehicle, the location classifier may determine the location the sound 5100 by comparing the first sound level, the second sound level, the third sound level, and the fourth sound level to one another. For example, the audio data generated by the set of one or more microphones may be enable the location classifier to triangulate a position of the sound 5100 in the vehicle based on the sound level difference.

In some implementations, the location classifier may determine the location based on detecting a time difference (e.g., phases in the audio data) between microphones of the set of one or more microphones receiving the sound 5100. For example, the location classifier may determine the location based on detecting a first time (e.g., a time "t1," resulting in a first phase) at the first microphone 5010, a second time (e.g., a time "t2," resulting in a second phase) at the second microphone 5020, a third time (e.g., a time "t3," resulting in a third phase) at the third microphone 5030, and a fourth time (e.g., a time "t4," resulting in a fourth phase) at the fourth microphone 5040. Based on the predetermined positions of the set of one or more microphones in the vehicle, the location classifier may determine the location the sound 5100 by comparing the first time, the second time, the third time, and the fourth time to one another. For example, the audio data generated by the set of one or more microphones may be enable the location classifier to triangulate a position of the sound 5100 in the vehicle based on the time difference.

Figure 6:
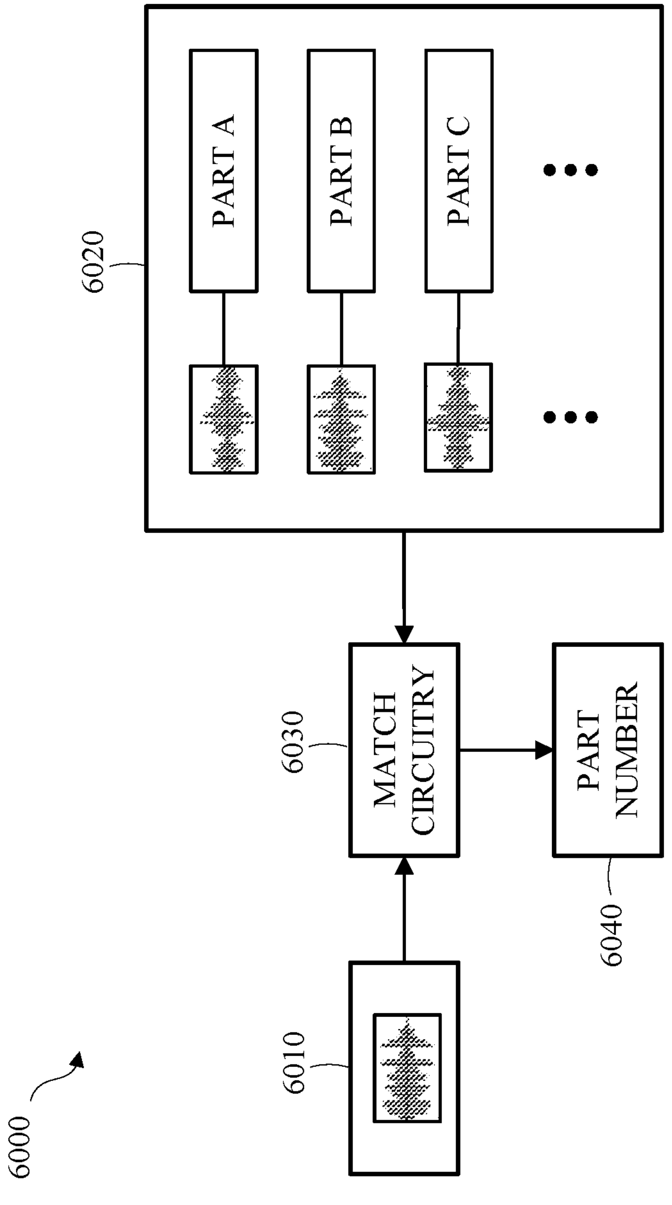
FIG. 6 is a block diagram of an example of a system for correlating a sound to a sound signature associated with a part of a vehicle.

FIG. 6 is a block diagram of an example of a system 6000 for correlating a sound 6010 to a sound signature associated with a part of a vehicle. For example, the sound 6010 could be the sound 5100 described in FIG. 5. The sound 6010 could be associated with the vehicle 1000 shown in FIG. 1, the vehicle 2100/2110 shown in FIG. 2, or the vehicle 4000 shown in FIG. 4. The system 6000 could be implemented by the system 3000 shown in FIG. 3. For example, the sound signature could be maintained in the data structure 3140.

A location classifier (e.g., the location classifier 3030) may determine the location of a sound 6010 in the vehicle based on correlating the sound 6010 to a sound signature associated with a part of the vehicle. For example, multiple sound signatures associated with different parts of the vehicle may be maintained in a data structure 6020 which may be accessed by the location classifier. For example, the data structure 6020 could be like the data structure 3140. The location classifier may use match circuitry 6030 to compare an amplitude, frequency, and phase of audio data associated with the sound 6010 (e.g., a sound) to amplitudes, frequencies, and phases of sound signatures in the data structure 6020 to determine a match. Determining a match may enable the location classifier to determine the location of the vehicle associated with the sound, which may be used to determine a location of a squeak or rattle associated with the vehicle. For example, the sound signatures in the data structure 6020 may be linked to part numbers of the vehicle, such as a first sound signature linked to Part A, a second sound signature linked to Part B, a third sound signature linked to Part C, and so forth. Determining a match between the sound 6010 and a sound signature (e.g., the second sound signature) may enable determining a particular part number 6040 (e.g., the Part B) associated with the sound. This may also enable, for example, ordering and replacement of a particular part associated with the sound (e.g., ordering and replacement of the Part B) to eliminate the sound (e.g., the squeak or rattle) from the vehicle.

Figure 7:
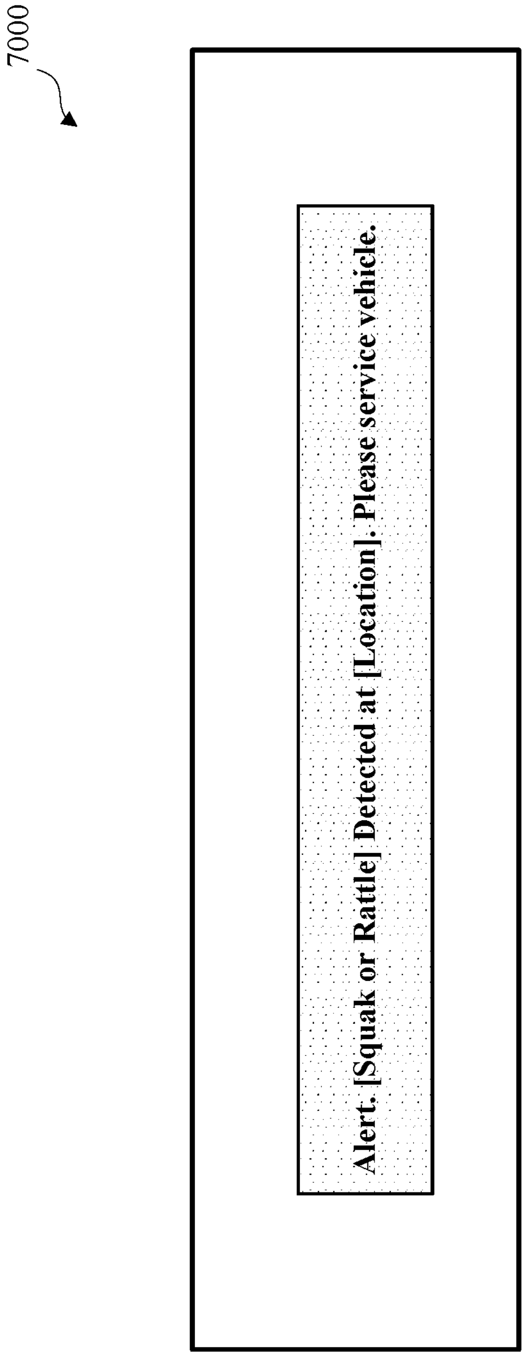
FIG. 7 is an illustration of an example of a graphical user interface (GUI) that may output a message to a human machine interface (HMI) in a vehicle.

FIG. 7 is an illustration of an example of a GUI 7000 that may output a message to an HMI in a vehicle. For example, the GUI 7000 could output the message to the HMI 3070 shown in FIG. 3. The GUI 7000 could output the message to an HMI in a vehicle like the vehicle 1000 shown in FIG. 1, the vehicle 2100/2110 shown in FIG. 2, or the vehicle 4000 shown in FIG. 4.

If a severity classifier (e.g., the severity classifier 3050) determines the severity to be a higher severity, the severity classifier 3050 may transmit a higher severity signal 3220 to output a message to an HMI in the vehicle (e.g., the user interface 1350). The message may be an alert to an occupant of the vehicle that a squeak or rattle was detected at a location, and that the occupant should stop the vehicle, lower the speed of the vehicle, or service the vehicle soon. The higher severity signal 3220 may be transmitted to the HMI in addition to the lower severity signal 3200. For example, the higher severity signal 3220 may also generate an OBD code corresponding to the action (e.g., the action 3180), and may cause the part classifier (e.g., the part classifier 3060) to determine a part number associated with a part of the vehicle based on the location.

Figure 8:
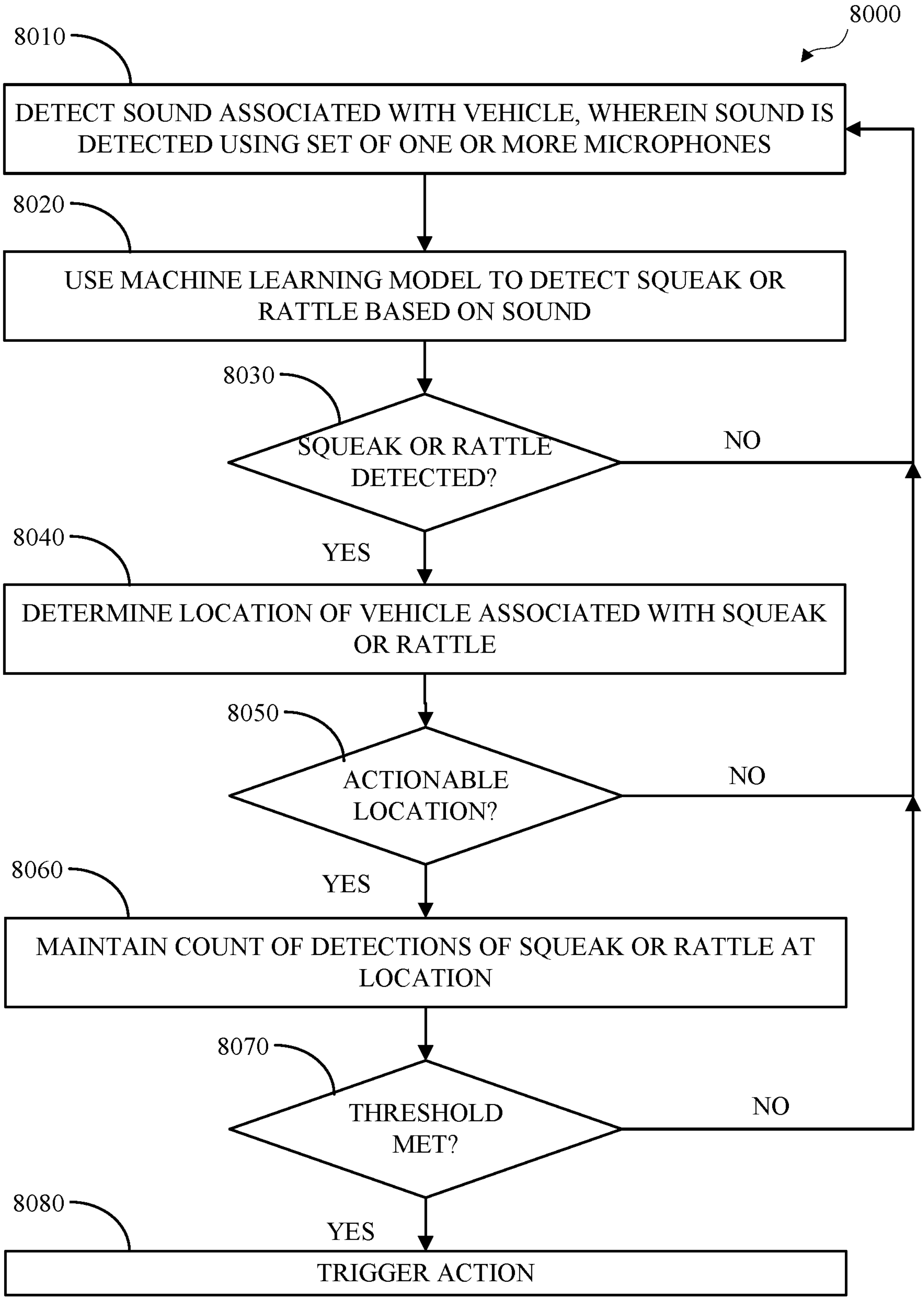
FIG. 8 is a flowchart of an example of a technique for determining a location of a squeak or rattle associated with a vehicle.

To further describe some implementations in greater detail, reference is next made to examples of techniques which may be performed by or using a system for determining a location of a squeak or rattle associated with a vehicle. FIG. 8 is a flowchart of an example of a technique 8000 for determining a location. The technique 8000 can be executed using computing devices, such as the systems, hardware, and software described with respect to FIGS. 1-7. The technique 8000 can be performed, for example, by executing a machine-readable program or other computer-executable instructions, such as routines, instructions, programs, or other code. The steps, or operations, of the technique 8000 or another technique, method, process, or algorithm described in connection with the implementations disclosed herein can be implemented directly in hardware, firmware, software executed by hardware, circuitry, or a combination thereof.

For simplicity of explanation, the technique 8000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 8010, a system (e.g., the system 3000, implemented using the controller 1300) may detect a sound associated with a vehicle. For example, the vehicle could implement the system 3000 shown in FIG. 3. The vehicle could be the vehicle 1000 shown in FIG. 1, the vehicle 2100/2110 shown in FIG. 2, or the vehicle 4000 shown in FIG. 4. The sound could be the sound 5100. The sound may be detected using a set of one or more microphones. For example, the sound may be detected using the set of one or more microphones 3010 shown in FIG. 3, the set of one or more microphones shown in FIG. 4, the set of one or more microphones shown in FIG. 5 (e.g., the first microphone 5010, the second microphone 5020, the third microphone 5030, and the fourth microphone 5040.

At 8020, the system may use a machine learning model to detect a squeak or rattle based on the sound. The machine learning model may be trained using a plurality of sounds emitted in relation to one or more vehicles. For example, a sound classifier (e.g., the sound classifier 3020) may use a machine learning model to detect a squeak or rattle, or background noise, based on the sound represented in audio data received from the set of one or more microphones. The sound classifier may use the machine learning model to process the audio data and detect the squeak or rattle based on the sound represented by the audio data.

At 8030, the system may determine whether the sound is a squeak or rattle. If the sound is not a squeak or rattle ("No," such as when the sound is determined to be background noise), the system may return to 8010 to detect a next sound associated with the vehicle. However, if the sound is a squeak or rattle ("Yes"), at 8040, the system may determine, based on detecting the squeak or rattle, a location of the vehicle associated with the squeak or rattle, and continue to 8050.

At 8050, the system may determine whether the sound that is a squeak or rattle is at a location that is an actionable location. If the location is not an actionable location ("No," such as when the location is a non-actionable location, which may be a location where a squeak or rattle is part of an expected operation of the vehicle), the system may return to 8010 to detect a next sound associated with the vehicle. However, if the location is an actionable location ("Yes," such as when the squeak or rattle is at a location where the squeak or rattle is not part of an expected operation of the vehicle), at 8060, the system may maintain a count of detections of the squeak or rattle at the location, and continue to 8070. For example, the squeak or rattle may be linked to a location, and the location may be linked to the count, which may be maintained in a data structure, such as the data structure 3170.

At 8070, the system may determine whether a threshold has been met for detections of a squeak or rattle is at the location that is an actionable location. Determining whether the threshold has been met may include comparing the count of detections (e.g., maintained at 8060) to a minimum threshold to determine if the count of detections exceeds the minimum threshold. If the threshold has not been met ("No"), the system may return to 8010 to detect a next sound associated with the vehicle. However, if the threshold has been met ("Yes"), at 8080, the system may trigger an action, and return to 8010 to detect a next sound associated with the vehicle. In some implementations, the action may be based on a severity of the detections of the squeak or rattle at the location, including as described below with respect to FIG. 9.

Figure 9:
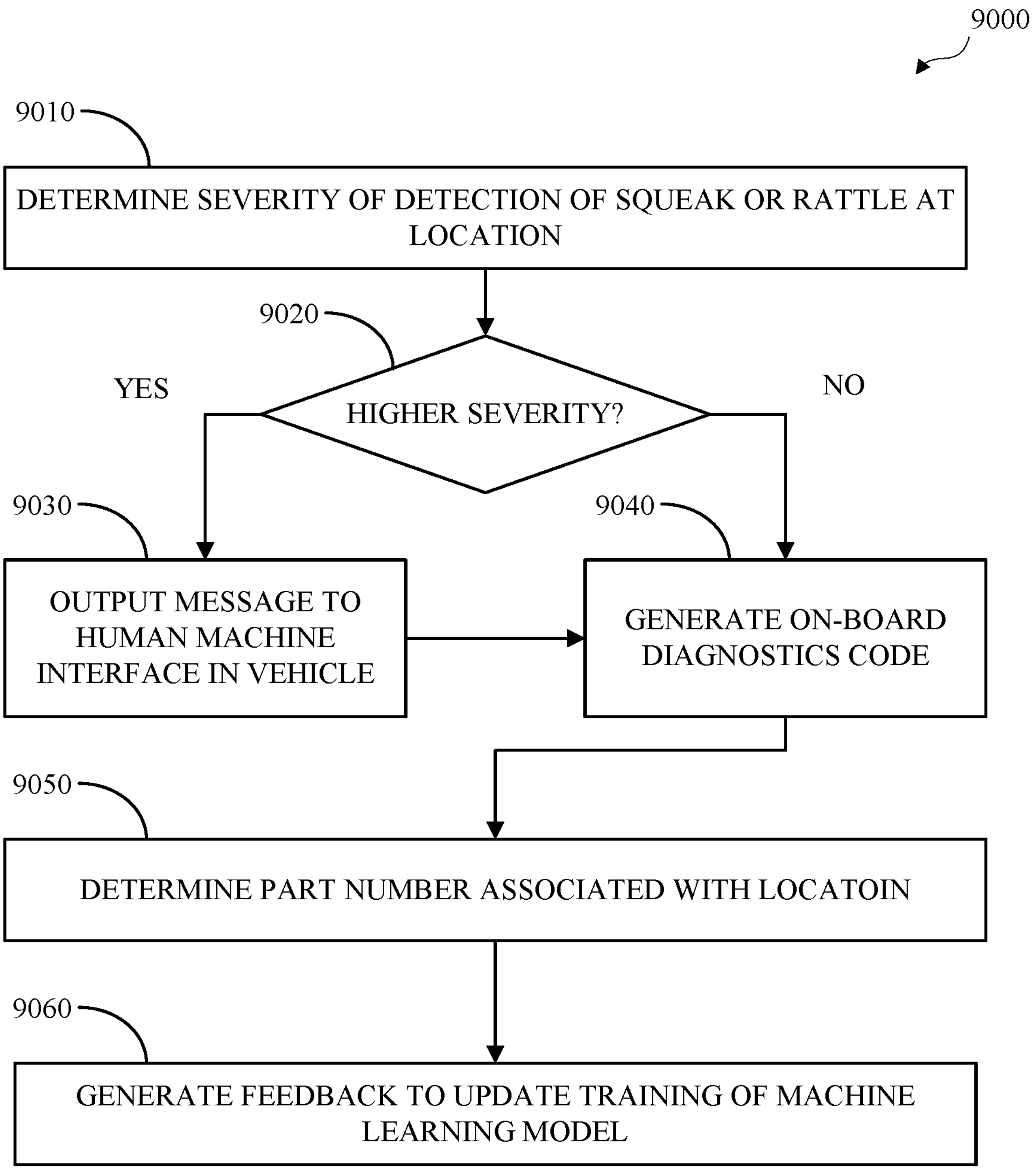
FIG. 9 is a flowchart of an example of a technique for triggering an action based on a squeak or rattle.

FIG. 9 is a flowchart of an example of a technique 9000 for triggering an action based on a squeak or rattle. The technique 9000 can be executed using computing devices, such as the systems, hardware, and software described with respect to FIGS. 1-7. The technique 9000 can be performed, for example, by executing a machine-readable program or other computer-executable instructions, such as routines, instructions, programs, or other code. The steps, or operations, of the technique 9000 or another technique, method, process, or algorithm described in connection with the implementations disclosed herein can be implemented directly in hardware, firmware, software executed by hardware, circuitry, or a combination thereof.

For simplicity of explanation, the technique 9000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 9010, a system (e.g., the system 3000, implemented using the controller 1300) may determine a severity of a squeak or rattle at a location. For example, the system could be the system 3000 shown in FIG. 3. The system could be implemented by a vehicle, such as the vehicle 1000 shown in FIG. 1, the vehicle 2100/2110 shown in FIG. 2, or the vehicle 4000 shown in FIG. 4. The system could determine the severity of a squeak or rattle at a location that is determined using the technique 8000 described in FIG. 8. The system may determine the severity in a number of ways, such as a ranking or grading. The severity could be determined to be a lower severity or a higher severity. For example, a severity classifier (e.g., the severity classifier 3050) may determines the severity to be a lower severity or a higher severity.

At 9020, the system may determine whether the severity is a higher severity or a lower severity. If the severity is a higher severity ("Yes"), at 9030, the system may output a message to an HMI in the vehicle, and continue to 9040. For example, the severity classifier may determine the severity to be the higher severity, and may transmit a higher severity signal (e.g., the higher severity signal 3220) to output a message to the HMI in the vehicle. The system could generate a GUI (e.g., the GUI 7000) which could output the message to the HMI. The message may be an alert to an occupant of the vehicle, output while the vehicle is in use, indicating that a squeak or rattle was detected at a location, and that the occupant should stop the vehicle, lower the speed of the vehicle, or service the vehicle soon. However, at 9020, if the severity is a lower severity ("No"), the system may proceed directly to 9040 (e.g., the severity classifier may determine the severity to be the lower severity, and the system may be bypass 9030, and prevent output of the message to the HMI, based on the lower severity).

At 9050, the system may generate an OBD (e.g., OBD-II) code corresponding to the squeak or rattle at the location. For example, the OBD code may be maintained in a data structure (e.g., the data structure 3210) that is accessed by the severity classifier.

At 9050, the system may determine a part number associated with a part of the vehicle based on the location. For example, the severity classifier may access a part classifier (e.g., the part classifier 3060) to determine a part number associated with a part of the vehicle based on the location.

At 9060, the system may generate feedback to update training of the machine learning model. For example, generation of the OBD code at 9040 may cause a log entry in a data structure (e.g., the data structure 3230). The log entry may be used to for tracking quality. In some cases, the log entry may be used by a feedback system (e.g., the feedback system 3080) to reinforce detections of true positives and true negatives by one or more machine learning models in the system (e.g., sounds may be recorded and fed back into the training, such as to reinforce true positives and true negatives, and reduce to false positives and false negatives).

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A computer-implemented method, comprising:

detecting, using a set of one or more microphones, a sound associated with a vehicle;

analyzing, using one or more machine learning models, to determine whether the sound associated with the vehicle is a squeak or a rattle, wherein at least one of the one or more machine learning models is trained using a plurality of sounds emitted in relation to one or more vehicles;

determining, using the one or more machine learning models, a location associated with the squeak or the rattle;

maintaining a count of detection of the squeak or the rattle at the location; and triggering an action when the count of detections at the location exceeds a minimum threshold, wherein the action comprises outputting an alert to a human machine interface in the vehicle that instructs an occupant to stop the vehicle, lower a speed of the vehicle, or service the vehicle soon, wherein the alert is displayed on a system-generated graphical user interface, indicates that the sound associated with the vehicle is the squeak or the rattle, and includes the location of the squeak or the rattle.

2. The computer-implemented method of claim 1, wherein the location is determined based on detecting different sound levels between a first microphone and a second microphone of the set of one or more microphones.

3. The computer-implemented method of claim 1, wherein the location is determined based on detecting a time difference between a first microphone of the set of one or more microphones receiving the sound and a second microphone of the set of one or more microphones receiving the sound.

4. The computer-implemented method of claim 1, wherein the location is determined based on correlating the sound to a sound signature associated with a part of the vehicle.

5. The computer-implemented method of claim 1, further comprising:

triggering a second action when the location is associated with a first part of the vehicle; and preventing the second action from triggering when the location is associated with a second part of the vehicle.

6. The computer-implemented method of claim 1, further comprising:

determining a lower severity or a higher severity based on the location;

generating an on-board diagnostics code when determining the lower severity; and outputting a message to a human machine interface (HMI) in the vehicle when determining the higher severity.

7. The computer-implemented method of claim 1, further comprising:

determining a severity level based on the location of the squeak or the rattle, wherein the severity level is lower when the location is associated with an interior trim of the vehicle than when the location is associated with a frame of the vehicle.

8. The computer-implemented method of claim 1, wherein the action further comprises:

determining a part number associated with a part of the vehicle based on the location.

9. The computer-implemented method of claim 1, wherein at least one of the one or more machine learning models is trained by playing squeaks and rattles through speakers configured in the one or more vehicles.

10. The computer-implemented method of claim 9, wherein the squeaks and rattles played through the speakers are generated synthetically by applying a force to one or more components of a vehicle to cause the one or more components to move in a manner that emits a sound.

11. A system, comprising:

a set of one or more microphones configured in relation to a vehicle;

a memory; and a processor configured to execute instructions stored in the memory to:

detect, using the set of one or more microphones, a sound associated with the vehicle;

analyze, using one or more machine learning models, the sound associated with the vehicle to determine whether the sound associated with the vehicle is a squeak or a rattle, wherein at least one of the one or more machine learning models is trained using a plurality of sounds emitted in relation to one or more vehicles;

determine, using the one or more machine learning models, a location associated with the squeak or the rattle;

determine a severity level based on the location of the squeak or the rattle, wherein the severity level is lower when the location is associated with an interior trim of the vehicle than when the location is associated with a frame of the vehicle; and trigger an action based on the severity level, wherein the action comprises outputting an alert to a human machine interface in the vehicle that instructs an occupant to stop the vehicle, lower a speed of the vehicle, or service the vehicle soon, wherein the alert is displayed on a system-generated graphical user interface, indicates that the sound associated with the vehicle is the squeak or the rattle, and includes the location of the squeak or the rattle.

12. The system of claim 11, wherein the location is determined based on detecting different sound levels between a first microphone and a second microphone of the set of one or more microphones.

13. The system of claim 11, wherein the location is determined based on detecting a time difference between a first microphone of the set of one or more microphones receiving the sound and a second microphone of the set of one or more microphones receiving the sound.

14. The system of claim 11, wherein the location is determined based on correlating the sound to a sound signature associated with a part of the vehicle.

15. The system of claim 11, wherein the processor is further configured to execute instructions stored in the memory to:

maintain a count of detections of the squeak or the rattle at the location; and trigger the action when the count of detections exceeds a minimum threshold.

16. The system of claim 11, wherein the processor is further configured to execute instructions stored in the memory to:

trigger a second action when the location is associated with a first part of the vehicle; and exclude triggering the second action when the location is associated with a second part of the vehicle.

17. The system of claim 11, wherein the processor is further configured to execute instructions stored in the memory to:

generate an on-board diagnostics code; and store the on-board diagnostics code in a data structure, wherein the on-board diagnostics code is accessible by a repair technician.

18. A vehicle, comprising:

an accessory loop;

a set of one or more microphones; and one or more processors that execute computer-readable instructions that cause the one or more processors to:

detect, using the set of one or more microphones, a sound associated with the vehicle;

analyze, using one or more machine learning models, the sound associated with the vehicle to determine whether the sound associated with the vehicle is a squeak or a rattle, wherein at least one of the machine learning models is trained using a plurality of sounds emitted in relation to one or more vehicles;

determine, using the one or more machine learning models, a location associated with the squeak or the rattle;

maintain a count of detections of the squeak or the rattle at the location; and trigger an action when the count of detections at the location exceeds a minimum threshold, wherein the action comprises outputting an alert to a human machine interface in the vehicle that instructs an occupant to stop the vehicle, lower a speed of the vehicle, or service the vehicle soon, wherein the alert is displayed on a system-generated graphical user interface, indicates that the sound associated with the vehicle is the squeak or the rattle, and includes the location of the squeak or the rattle.

19. The vehicle of claim 18, wherein the vehicle is an electric vehicle having an accessory loop, and the action uses the accessory loop when triggered.

20. The vehicle of claim 18, wherein the set of one or more microphones comprises microphones that vary in detection capability.

* * * * *